V. FOUCHIER.
Millstone Dress.
No. 33,301.
Patented Sept. 17, 1861.
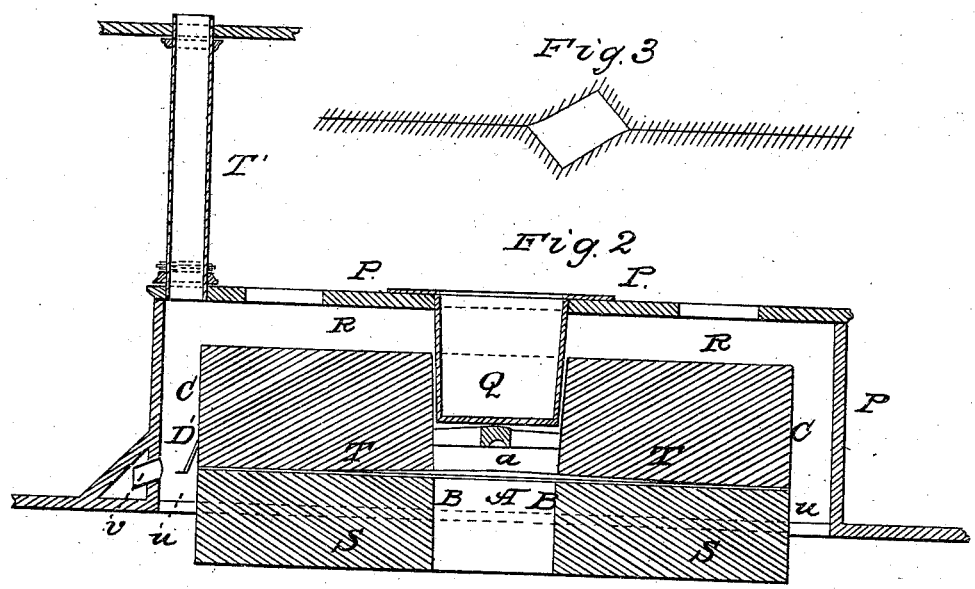
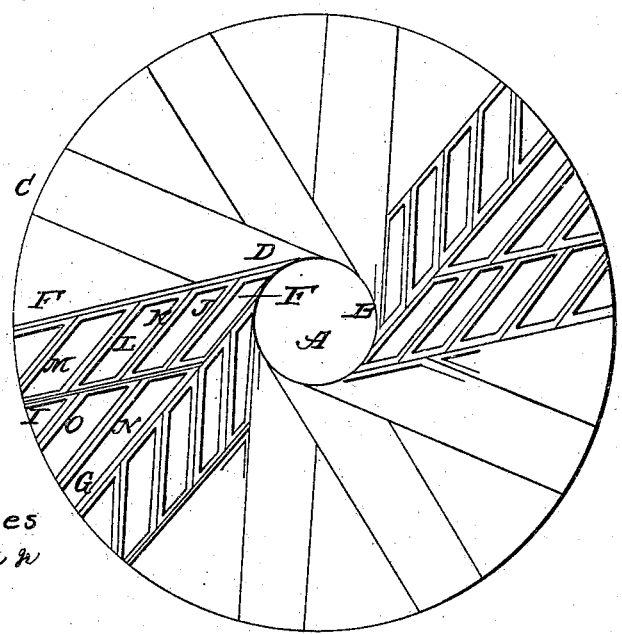

UNITED STATES PATENT OFFICE.

VICTOR FOUCHIER, OF PARIS, FRANCE.

IMPROVEMENT IN MILLS FOR GRINDING GRAIN.

Specification forming part of Letters Patent No. 33,301, dated September 17, 1861.

*To all whom it may concern:*

Be it known that I, VICTOR FOUCHIER, of Paris, in the Empire of France, have invented a new and useful Improvement in Mills for Grinding Grain; and I do hereby declare the same to be fully described in the following specification and illustrated in the accompanying drawings, of which—

Figure 1 denotes a plan or top view of a millstone provided with a dress or system of grooves in conformity to my invention. Fig. 2 is a vertical and central section taken through the eye of the runner and bed-stone, as well as through the case which surrounds such stones.

The nature of my invention consists in a new millstone-dress or arrangement of grooves for each stone.

The draft which is traced on the millstone, and is the main principle of my system, is composed of four sorts of furrows: first, the principal; second, the intermedial; third, the oblique or fetchers, and, fourth, the cutters or polishers, the latter being caused to grind so as to minutely divide the grain. Each kind of furrow has its special function, and each one operates in its own sphere on the hard, tender, mealy, or groaty part of the wheat or grain which is intended to be worked upon. Their eccentricity and the centrifugal force which results from it tend constantly to clear the furrows from the middlings and other particles given by the wheat when it is crushed under the stones. Those particles of wheat which by bolting are divided into different sizes are continually carried between the furrows and are there ground. By my system of dress the wheat is ground promptly with little pressure, and tends always to come out at the edge of the millstone, which, however, it cannot reach until it has attained a desirable degree of perfection. Besides, the air entering with the wheat through the eye of the stone and in a condensed state expands and circulates with it in all the furrows, which offer so many channels crossing each other. There it cools the crushed wheat, prevents the stones from emitting too much caloric, and produces middlings of a desired temperature without being overheated. This arrangement of furrows cannot be altered without materially changing the results.

Second and third. Standing on this principle, that the more the work is done near the center the less the force that is needed, I cause my stones to work near the eye. I give a conical shape to the eye from the upper to the lower part, it being of larger diameter at the upper part of it. This shape of the eye increases ventilation, and besides there opens into it a conductor leading from the top of the arch or case. All the air which is diplaced by the running stone is received through the eye. The consequence is little or no pressure and the absence of overheating of the flour, and this not only because a strong and expanding current of fresh air is caused to rush between the stones, but on account of the rapidity with which the eccentricity of the furrows causes the middlings to be driven toward the edges of the stones instead of rolling them constantly, as do the flat-furrowed millstones.

My system of millstone-dress produces a dry and round flour, which has much body and contains all the gluten of the wheat, and consequently can be bolted and afterward converted into bread with advantage, and, furthermore, it can be exported immediately without fear of alteration or souring.

Having explained the advantages of my invention, I shall now pass to the geometrical and mechanical description of the different parts which compose it.

*Description of the draft and furrows,* (Fig. 1.)—Having a pair of millstones of four feet and six inches each in diameter, I take the running-stone and while dressing it I give a declivity or gradual concave slope T (see Fig. 2) from the center to the circumference. Next I operate as follows in applying the draft and cutting the furrows: From the point A or center of the stone (see Fig. 1) trace a circle B B, of which the diameter is to correspond to that of the lower diameter of the eye. Next divide each of the circles B and C (the latter being the outer boundary of the stone) into ten equal parts, and unite the circumference of these two circles by ten lines tangential to the inner circle B, forming on each a principal furrow, such as shown at F G and E D, and terminating such furrow in the circumference C C by a slight elbow or turn. About at one-third of the length of the furrow F G and at the point H, I draw another furrow H I oblique to F G. This furrow H I may be termed the "oblique furrow" or "fetcher," because it operates in a sense contrary to the rotation of the millstone and retains the middlings until they are finely ground.
next divide both furrows H I and E D correspondingly, and form the furrows J K L M parallel to F G, increasing them progressively, the distances between the furrows being increased from the heart to the circumference, as shown in the drawings.

Upon the furrows H I, I trace two emptying-furrows N O parallel to F G, taking good care that their points of intersection with H I shall not be immediately opposite those of the furrows J K L M. This being done for one division of the stone, I proceed in the same manner with each of the remaining nine. All these furrows communicate with one another, and at their points of intersection may be widened a little, in which case they will operate to better advantage.

The transverse sections and forms of the furrows of the stones are given, as indicated in Fig. 3.

My arrangement of the furrows is such as to enable air to circulate freely through them during the grinding operation. The free ventilation of the millstones is maintained by means of a good entrance and a good outlet for the cool air. As friction constantly produces a new emission of caloric and the movement of rotation of the runner tends always by the effect of the centrifugal force and by the dilation of the hot air to drive away the air which is under the millstones, it is necessary to have a continual renewal of air, for experience has proved that wheat, as well as other vegetables containing a natural principle of fermentation which should be neither too much developed nor entirely compressed, it being developed to an extent that will allow the flour on coming out from the millstones to bear without injury the contact of the outside air and preserve the qualities which enable it to be bolted, make it ready to be converted into bread, and fit it to be immediately exported. By means of the arch or case the air displaced by the millstone escapes afterward in part and with the flour through a spout $v$. I give to the eye $a$ of the running-stone R a conical form from the upper to the lower end of it and in such a manner as to compress the air while passing through it, such air afterward expanding with more force in the furrows. I also make in the center of the case P an opening proportional to the eye and apply thereto a tin pipe Q of a conical form like that of the eye and descending into the eye of the running-stone, but fitted, however, in such a manner as not to occasion any friction on the internal sides of the eye, which it almost touches. This being done for the free entrance and contraction of the air in the eye, I make in the case and for the egress of air several openings, each of which may be covered over with a piece of canvas well stretched and nailed over them. This canvas will allow the air to pass freely through it without permitting the escape of flour through it. Besides this I fix near the spout $v$ in the side of the case a chimney T', which must be adapted to an opening made for this purpose in the case. Such chimney may end in a general (main) pipe for all kinds of millstone, or in a special chamber. The effect is more complete when an aspirator is applied at the issue of the main pipe. A ditch $u$ surrounds the bed-stone. In order to avoid the accumulation of the middlings around the bed-millstone and to facilitate the evaporation of the air, a "gatherer" or piece of tin D' may be affixed to the running-stone and made to extend into the ditch. Both the millstones being furrowed and turned, the one over and upon the other, all the furrows present general intersections and work like scissors. The upper stone or runner R being put in motion at the rate of one hundred and thirty to one hundred and forty revolutions per minute, the wheat enters through the eye $a$ and the tunnel Q with the free air from without which the millstone attracts and discharges. The wheat by the centrifugal force and the column of air is carried forward into the principal furrows D E and F G, which receive it and crush it near the eye and next transmit it to the intermediate furrows J K L M, which during its passage between the surfaces produce the division of the different parts of the wheat. The toughest part, which is not perfectly ground, will be brought back by the oblique furrow or fetcher H I, which retains it and compels it to be thoroughly ground before it may pass through the polishing or cutting furrows N O, which by their action polish the particles and discharge them from the stones. The bed-stone S is perfectly straight from its center to its edge. The running-stone only receives for the entrance of the wheat a declivity or gradual slope T from the center to the circumference.

What I claim as my invention is—

The above-described arrangement of principal, intermediate, oblique, and cutting and discharging furrows D E, F G, J K, L M, H I, and N O of each of the angular sections arranged on the grinding-surface of the millstone, as described.

V. FOUCHIER.

Witnesses:
  B. J. SNÉLBRAND,
  J. BASSET.